(No Model.) 2 Sheets—Sheet 1.
F. F. KING.
MOTOR.
No. 549,873. Patented Nov. 12, 1895.
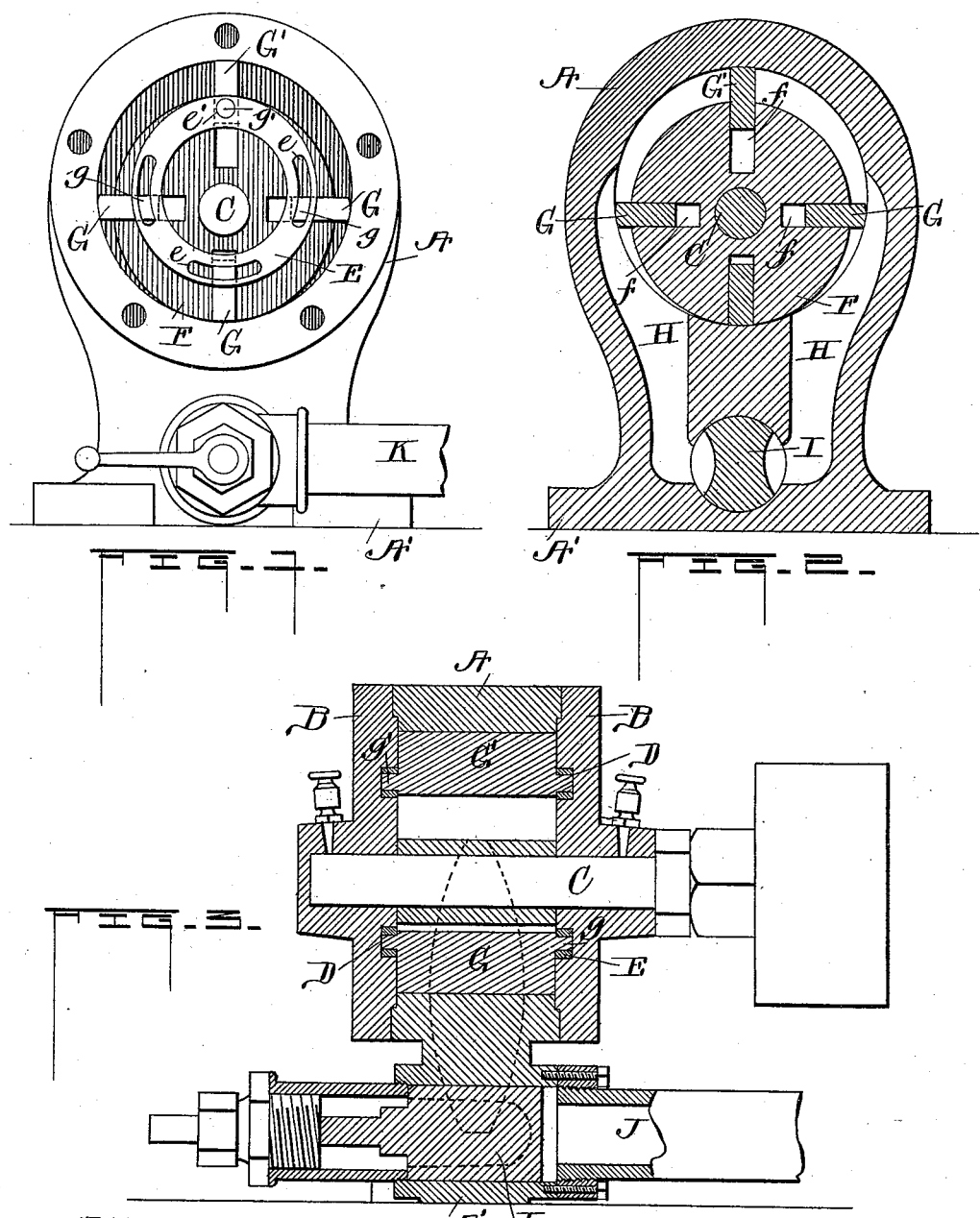
Witnesses:
Chas. W. La Porte
Abraham Jacobson
Inventor,
Fremont F. King,
by W. V. Tefft,
Att'y.

(No Model.) 2 Sheets—Sheet 2.
F. F. KING.
MOTOR.
No. 549,873. Patented Nov. 12, 1895.
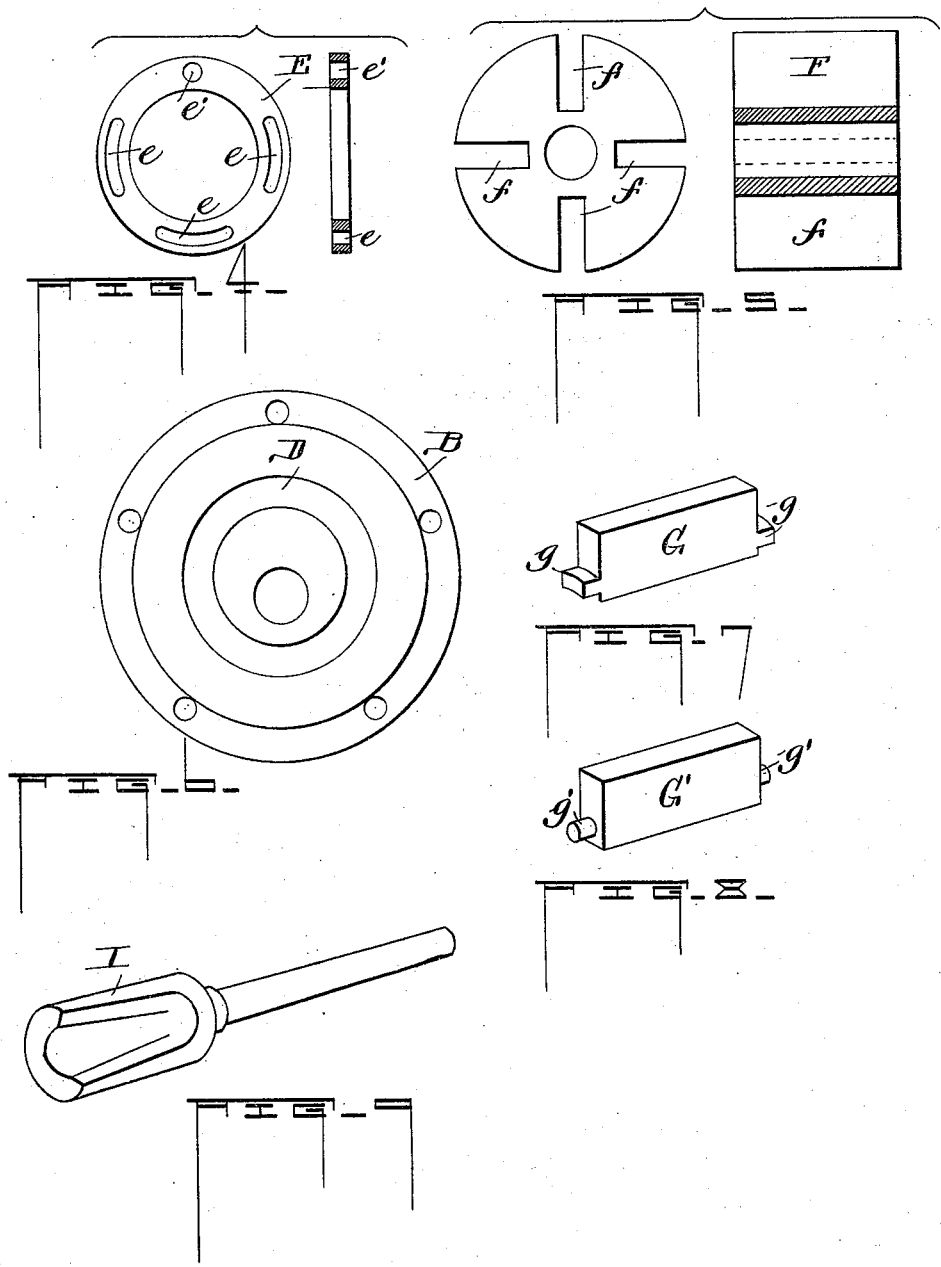

UNITED STATES PATENT OFFICE.

FREMONT F. KING, OF PEORIA, ILLINOIS.

MOTOR.

SPECIFICATION forming part of Letters Patent No. 549,873, dated November 12, 1895.

Application filed June 20, 1895. Serial No. 553,410. (No model.)

*To all whom it may concern:*

Be it known that I, FREMONT F. KING, a citizen of the United States, residing at Peoria, in the county of Peoria and State of Illinois, have invented certain new and useful Improvements in Motors; and I do hereby declare that the following is a full, clear, and exact description of the invention, which will enable others skilled in the art to which it appertains to make and use the same.

My invention relates to certain new and useful improvements in rotary engines by means of which an engine is provided being simple in construction, effective in operation, durable, and cheap in first cost.

My object is to provide an engine which may be run by steam, water, or compressed air by simply varying the size of the inlet-port.

A further object is to provide an effective engine in which the number of parts shall be reduced to a minimum and shall be so carried as to prevent excessive friction and obviate the wear of the parts thereof in such a manner as to render them very durable; and a further object is to furnish an engine at a low initial cost, thereby adapting it to general use wherever power is required with the various purposes of the farmer and either the small or large manufacturer.

With these needs in view my invention consists, essentially, in certain features of construction and combination of parts, as will be hereinafter described, and pointed out in the claims.

In the accompanying drawings, Figure 1 is an end view of my device with one of the heads removed, showing particularly the arrangement of the material parts. Fig. 2 is a cross-section through the device. Fig. 3 is also a cross-section of the device. Fig. 4 is a detail view of a slotted and perforated ring, the same being an element of invention in the device. Fig. 5 shows a slotted body-piece or large shaft provided with grooves. Fig. 6 shows a head or plate adapted for bearing in connection with the cylinder. Fig. 7 is a detailed view of a block which serves as a wing element in the operation of my device. Fig. 8 is also a block similar to that shown in Fig. 7 and useful for the same purpose. Fig. 9 is a valve used in connection with my engine.

In the drawings, A refers to a cylindrical casing, constructed of any suitable material, and A' is a supporting base therefor, the said cylinder having one or both of its ends covered by the heads B, the same being identical in construction and are bolted to the curved portion of the said cylinder in any well-known or approved manner. Each head B is provided with a shoulder which is adapted to fit snugly within the ends of the curved portions of the casing in corresponding shoulders provided in connection therewith to form a snug joint, the centers of said heads having outward projections therefrom and being provided with suitable bearings for shaft C. The inner faces of each of the heads B B are provided with a circular groove D, concentric with the circumference of the said heads, and is formed with considerable depth and with rectangular sides and provides a seat for a ring E, the said ring being carried within the said groove in such a manner that it will fit perfectly therein, so that there will be no space left excepting that sufficient to enable the same to turn freely within the groove, and is made flush with the inner face of the head, and is provided with the slots $e$, and the perforation $e'$, as shown particularly in Fig. 4 of the drawings.

F is a body-piece or wheel fixed upon shaft C, which said shaft has a non-concentric bearing with reference to the outside casing, the same having a corresponding non-concentric bearing with relation to the said casing, it being carried in such a manner that there is substantially a contact of the said wheel with the lower portion of the interior circumference of the said casing and leaving a gradually widening space between said point between said wheel and casing until the maximum separation is obtained at the top of said casing. At suitable intervals the periphery of the wheel is provided with radial slots $f$—in the present instance four. These slots $f$ preferably extend from the periphery of the wheel about two-thirds of the distance to the center; but may be deeper or shallower, as found expedient. It is desirable that the wheels of the slots be smooth and solid, even should the wheel itself be formed hollow or skeleton, in order that an essentially tight steam-joint be formed between the wheel and the abutment.

G G G G' are blocks or plates which, in future in the specification we will denominate "wings," each of the said wings having a width equal to the width of the steam-chamber or slightly less, to admit of a free sliding movement, and a thickness equal to that of the slot $f$, or sufficiently less to admit of a free sliding movement therein. At either end of the said wings and nearer to the lower edges thereof there are formed or provided the wings G with the lugs $g$, provided with a slight curvature, and the wing G' with the pins $g'$, such projections being provided to adapt them for bearing, those on wings G in slots $e$ in ring E and those on wings G' within the perforation $e'$ in ring E, which said bearing, in connection with the concentric-bearing ring E with relation to the casing, will cause the said wings or the upper edges thereof to bear constantly in close touch or proximity to the interior surface of the said case, so that as the wheel F revolves within the casing the grooves $f$ will serve to swing the wings outwardly and hold them in that position while receiving the pressure from the power and then return them as they pass the contacting or approximate point between the wheel and the bottom portion of the casing, the said wings being guided in their sliding movement by the ring E, with which said rings the wings are connected in the manner previously stated, there being provided sufficient play in making such connections as to adapt the same to slight shifts from the normal bearing thereof and at the same time prevent frictional contacts thereof with the interior walls of the chamber, and insuring that such bearings shall not be other than that occasioned by the force of centrifugal action caused by the turning of said wheel, which would not be enough to cause any extensive wear upon said surface.

I desire to call particular attention to the ring E, the manner of its being carried—the same being seated in grooves in the heads B concentric with the circumference thereof and flush with the inner surfaces of the same—to the manner in which the wings are connected with said rings, and desire that it shall be noted and understood that by the provision of this ring that said wings will always be maintained in the desired approximately-contacting relation of the outer edges thereof with the interior circumference of the casing, without causing any positive frictional bearing in relation therewith, as would be the case if springs were used to maintain the same in such relation. I also desire to call attention to the detail manner in which I make my connection—that is, by means of the lugs $g$ on the wings G, with the slots $e$ in the ring, and on the wing G' by means of pins $g'$ being carried in the perforation $e'$ in said ring—this particular manner of connecting the said wings and rings aiding particularly and materially in the effective and complete operation of the device. H H H are the usual steam-ports (the device being shown herein as constructed in a manner to accommodate the use of steam). I is a valve, the same being oppositely recessed in the manner shown. J is the steam-inlet and K is the exhaust of it, these features being given as common to engines, excepting that the valve used herein is especially designed to adapt it for use particularly with this style and class of engines.

I deem it unnecessary to refer particularly to the various other details relating to the connecting of the parts to render the device substantial and the minor elements essential to the working of all the engines, but have referred particularly to all essential points, and in such a manner that it may be fully and completely understood.

Having thus fully pointed out all the parts, I will state briefly the operation of the device.

Power being applied to turn rings E, the wheel F will be revolved, causing the same to turn in the interior of the casing, the same having a non-concentric bearing therein. During such turning of the wheel, wings G, G, G, and G', adjustably carried in the slots in said wheel and being positively supported in connection with the rings E E, causes the said wings to be maintained in a concentric position with relation to the said ring and the said casing, with the constant bearings of the outer ends thereof with the rotary surface of said casing, therefore the said wings will be caused to be slid back and forth within the slots in the wheel F. The steam entering the casing or cylinder through the steam-inlet port and exerting its force upon the said wings, first upon the one and then upon the other, successively, as they pass in their rotation, will cause such rotation of the wheel as previously specified in the operation and will exhaust in the usual manner and through the channel, as shown in the drawings, either to one port or the other, according to the direction in which the wheel F is being driven, which is adapted to be turned in the one direction or the other, according as it may be desired.

As it is intended to furnish a rotary engine, which may be kept in stock and shipped upon demand to be set up wherever steam, water, or compressed air can be utilized, for which it may be desirable to construct the ports in such manner that they may be readily enlarged or contracted to suit the different powers, (for example, when water is employed the port should be considerably larger than when steam is used,) a port may be provided with internal threads and a set of hollow plugs may be provided having one end fitted to the port and the other ends and the other burrs of different sizes to suit the power. This is one of several arrangements which may be adopted to secure the desired result. The engine thus constructed is extremely simple and effective, and meets the popular want because of its moderate cost and general utility.

Having thus fully described my invention, what I claim, and desire to secure by Letters Patent, is—

1. In a rotary engine, the combination of a cylindrical casing provided with circular grooves in the interior faces of the heads thereof concentric with the circumference of the casing, rings carried within said grooves and provided with slots $e, e, e$, and the perforation $e'$, a wheel journaled in said casing and bearing non-concentrically therein with relation to the interior circumference thereof and provided with slots opening upon its surface, and wings supported in connection with said rings by curved lugs $g, g, g$, and pin $g'$, projecting therefrom and bearing within the slots and perforation in said rings, adapting said wings for free movement within the slots in the said wheel and to be freely rotated thereby, within the said casing, maintaining a close sliding fit therein, and the valve I, oppositely recessed, all substantially as set forth.

2. In a rotary engine, the combination of the case A, with its inlet and outlet ports and the circular grooves D, D, in the heads B, B, concentric with the interior circumference of the case, the eccentrically placed cylinder F, therein, the wings G, G, G and G', adjustably carried in slots in the cylinder and provided with curved lugs $g, g, g$ and the pin $g'$, the rings E, E, fitting within the grooves D, D and provided with slots $e, e, e$, and the perforation $e'$; and the valve I, having the opposite recesses, all substantially as described and shown.

In testimony whereof I affix my signature in presence of two witnesses.

FREMONT F. KING.

Witnesses:
CHAS. W. LA PORTE,
N. A. WOODSON.